(12) United States Patent
Zoeter et al.

(10) Patent No.: US 8,037,043 B2
(45) Date of Patent: Oct. 11, 2011

(54) INFORMATION RETRIEVAL SYSTEM

(75) Inventors: Onno Zoeter, Grenoble (FR); Michael J. Taylor, Cambridge (GB); Edward Lloyd Snelson, Cambridge (GB); John P. Guiver, Saffron Walden (GB); Nicholas Craswell, Cambridge (GB); Martin Szummer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 12/207,315

(22) Filed: Sep. 9, 2008

(65) Prior Publication Data

US 2010/0076949 A1    Mar. 25, 2010

(51) Int. Cl.
*G06F 17/30* (2006.01)
(52) U.S. Cl. ........ 707/705; 707/706; 707/707; 707/708; 707/709; 707/758; 707/769; 707/770
(58) Field of Classification Search .......... 707/705–709, 707/758, 769–770
See application file for complete search history.

(56) References Cited

U.S. PATENT DOCUMENTS

| | | | |
|---|---|---|---|
| 6,507,841 B2 | 1/2003 | Rivierieulx de Varax | |
| 6,662,177 B1 * | 12/2003 | Martino et al. ........................ | 1/1 |
| 7,680,752 B1 * | 3/2010 | Clune, III et al. ............... | 706/45 |
| 2004/0267730 A1 * | 12/2004 | Dumais et al. ..................... | 707/3 |
| 2005/0125390 A1 * | 6/2005 | Hurst-Hiller et al. ............. | 707/3 |
| 2006/0200460 A1 | 9/2006 | Meyerzon et al. | |
| 2006/0253428 A1 | 11/2006 | Katariya et al. | |
| 2007/0100824 A1 | 5/2007 | Richardson et al. | |
| 2007/0208730 A1 | 9/2007 | Agichtein et al. | |
| 2008/0104045 A1 * | 5/2008 | Cohen et al. ....................... | 707/4 |
| 2008/0114751 A1 | 5/2008 | Cramer et al. | |
| 2008/0281809 A1 * | 11/2008 | Anderson et al. ................. | 707/5 |
| 2009/0265341 A1 * | 10/2009 | Nordahl ............................ | 707/5 |
| 2009/0327224 A1 * | 12/2009 | White et al. ...................... | 707/3 |
| 2009/0327270 A1 * | 12/2009 | Teevan et al. ..................... | 707/5 |
| 2010/0083217 A1 * | 4/2010 | Dalal et al. ..................... | 717/106 |
| 2010/0169179 A1 * | 7/2010 | Ramer et al. ............... | 705/14.54 |

FOREIGN PATENT DOCUMENTS

WO    WO2007139610    12/2007

OTHER PUBLICATIONS

Agichtein, et al, "Improving Web Search Ranking by Incorporating User Behavior Information", retrieved at <<http://www.mathcs.emory.edu/~eugene/papers/sigir2006ranking.pdf>>, ACM, 2006, pp, 1-8.
Agrawal, et al, "Diversifying Search Results", SIGIR, 2008, pp. 1-8.

(Continued)

*Primary Examiner* — Frantz Coby
(74) *Attorney, Agent, or Firm* — Lee & Hayes, PLLC

(57) ABSTRACT

An information retrieval system is described for retrieving a list of documents such as web pages or other items from a document index in response to a user query. In an embodiment a prediction engine is used to predict both explicit relevance information such as judgment labels and implicit relevance information such as click data. In an embodiment the predicted relevance information is applied to a stored utility function that describes user satisfaction with a search session. This produces utility scores for proposed lists of documents. Using the utility scores one of the lists of documents is selected. In this way different sources of relevance information are combined into a single information retrieval system in a principled and effective manner which gives improved performance.

20 Claims, 8 Drawing Sheets

OTHER PUBLICATIONS

"An Outline of Generalized Linear Models", CRC Press, 2nd Edition, 1989, pp. 21-32.

Broder, "A Taxonomy of Web Search", retrieved at <<http://www.sigir.org/forum/F2002/broder.pdf>>, available at least as early as Jul. 15, 2008, IBM Research, pp. 1-8.

Burges, et al, "Learning to Rank with Nonsmooth Cost Functions", retrieved at <<http://research.microsoft.com/~cburges/papers/lambdarank.pdf, NIPS, 2006, pp. 1-8.

Chen, "Probabilistic Models for Retrieving Fewer Relevant Documents", ACM, 2006, pp. 1-8.

Chu, "Gaussian Processes for Ordinal Regression", Journal of Machine Learning Research 6, 2005, pp. 1019-1041.

Cox, et al, "The Bayesian Image Retrieval System, PicHunter: Theory, Implementation, and Psychophysical Experiments", IEEE Transactions on Image Processing, vol. 9, No. 1, Jan. 2000, pp. 20-37.

Fox, et al, "Evaluating Implicit Measures to Improve Web Search", ACM, vol. 23, No. 2, Apr. 2005, pp. 147-166.

Jarvelin, et al, "IR Evaluation Methods for Retrieving Highly Relevant Documents", retrieved at <<http://www.info.uta.fi/tutkimus/fire/archive/KJJKSIGIR00.pdf>>, Proceedings of the 23rd Annual International ACM SIGIR Conference on Research and Development in Information Retrieval, 2000, pp. 41-48.

Joachims, "Optimizing Search Engines using Clickthrough Data", ACM, 2002, pp. 1-10.

Joachims, et al, "Search Engines that Learn from Implicit Feedback", retrieved at <<http://ieeexplore.ieee.org/xpls/abs_all.jsp?tp=&arnumber=4292009&isnumber=4291993>>, IEEE, 2007, pp. 34-40.

Lafferty, et al, "Document Language Models, Query Models, and Risk Minimization for Information Retrieval", ACM, 2001, pp. 1-9.

"Learning Retrieval Functions from Implicit Feedback", retrieved Jul. 16, 2008 at <<http://www.cs.cornell.edu/People/tj/career/>>, Cornell University, pp. 1-4.

Lim, et al, "Variational Bayesian Approach to Movie Rating Prediction", ACM, 2007, pp. 1-7.

McCullagh, et al, "An outline of generalized linear models", Chapter 2, CRC Press, 2nd Edition, 1990.

Minka, "A Family of Algorithms for Approximate Bayesian Inference", retrieved at <<http://vismod.media.mit.edu/pub/tech-reports/TR-533.pdf>>, Massachusetts Institute of Technology, Jan. 12, 2001, pp. 1-75.

Najork, et al, "Hits on the Web: How Does it Compare?", retrieved at <<http://research.microsoft.com/~najork/sigir2007.pdf>>, ACM SIGIR, Jul. 23-27, 2007, pp. 1-8.

Radlinski, et al, "Learning Diverse Rankings with Multi-Armed Bandits", retrieved at http://icml2008,cs.helsinki.fi/ papers/264.pdf>>, Proceedings of the 25th International Conference on Machine Learning, 2008, pp. 1-8.

Radlinski, et al, "Query Chains: Learning to Rank from Implicit Feedback", retrieved at <<http://www.cs.cornell.edu/people/tj/publications/radlinski_joachims_05a.pdf>>, ACM, 2005, pp: 1-10.

Robertson, et al, "Simple BM25 Extension to Multiple Weighted Fields", retrieved at <<http://portal.acm.org/citation.cfm?id=1031181>>, CIKm, 2004, pp. 42-49.

Robertson, "The Probability Ranking Principle in IR", Journal of Documentation, vol. 33, 1977, pp. 294-304.

Shen, et al, "Context-Sensitive Information Retrieval Using Implicit Feedback", retrieved at <<http://portal.acm.org/citation.cfm?id=1076045>>, ACM, 2005, pp. 43-50.

Taylor, et al, "SoftRank: Optimizing Non-Smooth Rank Metrics", ACM 2008, pp. 77-86.

Wong, et al, "Information Retrieval Based on Axiomatic Decision Theory", Gernal Systems, 1991, Volumen 19(2), 23 (2) pp. 101-117.

Zoeter, et al, "A Decision Theoretic Framework for Implicit Relevance Feedback", Microsoft Research Cambridge, Dec. 7-8, 2007, pp. 1-12.

Zoeter, "Bayesian Generalized Linear Models in a Terabyte World", retrieved at <<http://www.ieeexplore.ieee.org/xpl/freeabs_all.jsp?tp=&arnumber=4383733&isnumber=4383645>>, IEEE Conference on Image and Signal Processing and Analysis, 2007, pp. 1-6.

Zoeter, et al, "Gaussian Quadrature Based Expectation Propagation", retrieved at <<http://eprints.pascal-network.org/archive/00001870/01/zoeter_quadep.pdf>>, available at least as early as Jul. 15, 2008, Faculty of Science, University of Nijmegen, pp. 1-8.

Zoeter, "Slides—A Decision Theoretic Framework for Implicit Relevance Feedback", NIPS, Dec. 2007, pp. 1-8.

* cited by examiner

INFORMATION RETRIEVAL SYSTEM

BACKGROUND

Web search systems are an example of one type of information retrieval system although the present invention is concerned with information retrieval systems of any type. Web search systems enable us to find web sites, documents, files, images and the like that best suit our requirements. Three main components are used to achieve this: web crawlers; index generators; and query servers.

Web crawlers crawl the web one link at a time and send identified web pages to be indexed. This is achieved by making use of links between web sites. This web crawling process can be thought of as a continual process of identifying new web sites and identifying updates to existing web sites.

The crawling process enables many billions of web pages to be identified and in order to make use of this information a systematic way of retrieving pages is required. An index generator provides part of this means. Similar to an index in the back of a book, the index generator identifies keywords to associate with each website's content. Then, when you search for those keywords, the search system can find the most appropriate pages out of the billions that are available.

The index generator includes such information as how often a term is used on a page, which terms are used in the page title, or in the index, for the subsequent use of the query server in ranking the documents. Other information such as the language that the web site is written in and information about how many other web sites link to the web site concerned can also be used.

A query server (also referred to as a search engine or ranker) is used to rank the index documents on the basis of how well they match user input search terms. The query server analyses the user search terms and compares them with the indexed web pages. Previous query servers have operated by generating a rank or score for the indexed web pages on the basis of the user input search terms. In this way, web pages relevant to the user search terms are identified with scores or ranks to indicate the degree of likelihood of relevance.

There is an ongoing need to improve the relevance of items retrieved by information retrieval systems such as web search systems. In addition, there is a need to achieve this in a fast and computationally inexpensive manner, which reduces the need for storage resources where possible.

The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An information retrieval system is described for retrieving a list of documents such as web pages or other items from a document index in response to a user query. In an embodiment a prediction engine is used to predict both explicit relevance information such as judgment labels and implicit relevance information such as click data. In an embodiment the predicted relevance information is applied to a stored utility function that describes user satisfaction with a search session. This produces utility scores for proposed lists of documents. Using the utility scores one of the lists of documents is selected. In this way different sources of relevance information are combined into a single information retrieval system in a principled and effective manner which gives improved performance.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
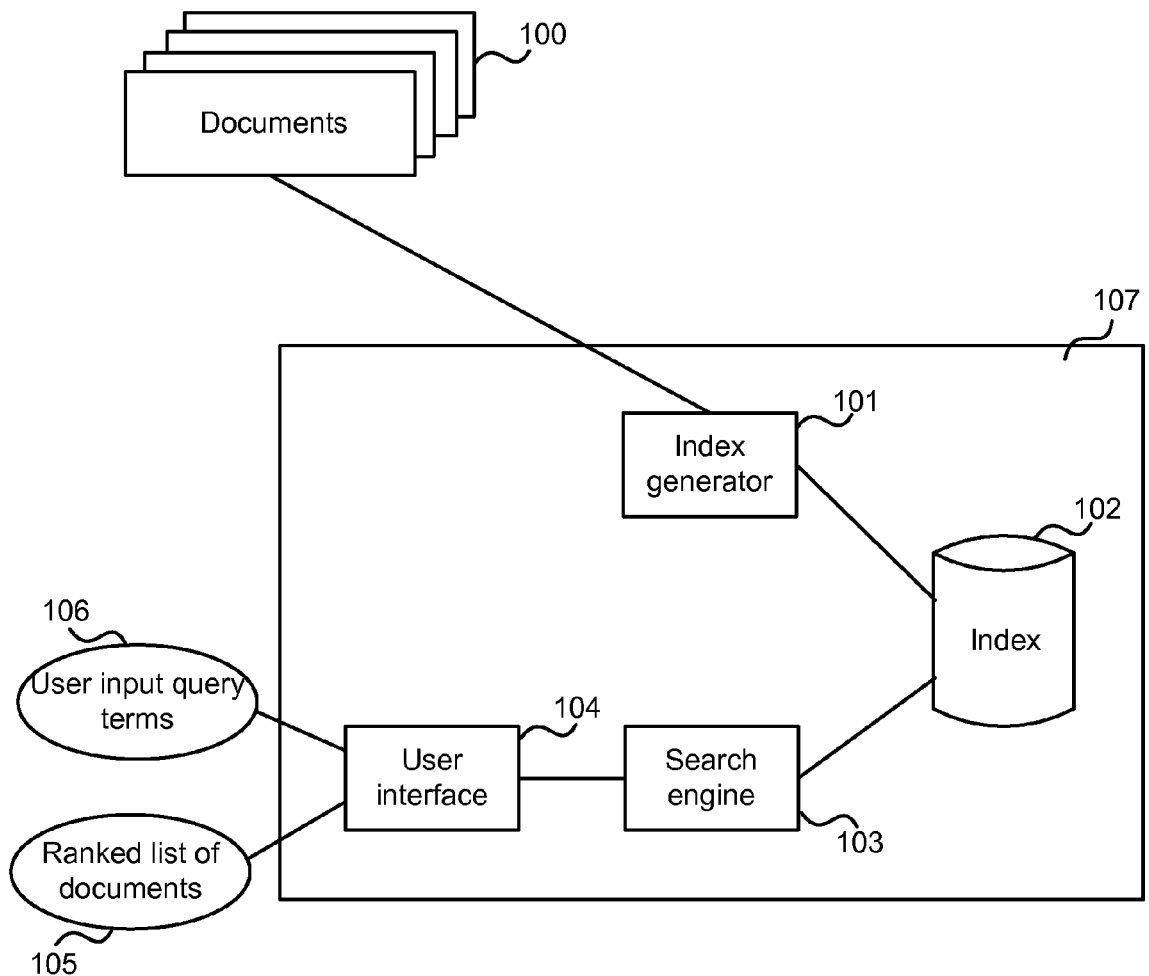
FIG. 1 is a schematic diagram of an example information retrieval system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a web search system, the system described is provided as an example and not a limitation. As those skilled in the art will appreciate, the present examples are suitable for application in a variety of different types of information retrieval systems including but not limited to data centers, file search systems on PCs, document retrieval systems, image search systems and any systems which retrieve content from a collection of content items of any type.

The term "document" is used herein to refer to any item of information which may be retrieved using a query server or search engine. A non-exhaustive list of examples is: photograph, digital image, file, email message, voice mail message, short message service message, web page, part of a web page, map, electronic ink, commercial product, multimedia file, song, album, news article, database record or a summary of any one or more of these items.

The term "explicit feedback" is used to refer to proactive feedback from a judge (for example, a human assessor or automated assessor) about the relevance of a document retrieved by an information retrieval system. For example, this may be a label assigned to a document by a human judge, given a specified query. The label may act to classify the document into one of a plurality of classes depending on how relevant the judge perceives the document to be to the query. Explicit feedback can also be thought of as an evaluation of one or more documents in a ranked list in view of the query terms used to obtain that ranked list. Explicit feedback may also be referred to as explicit relevance information.

In order for feedback to be explicit, active user input or action by a judge is required in response to a query or request to that judge to make a judgment. In contrast, for "implicit feedback" (also referred to as implicit relevance information) active user input in response to a request to make a judgment is not required. It can also be thought of as passive feedback. Examples of implicit feedback include click data such as query-document pairs. A query-document pair is a query entered by a user to a search engine and a link or other identifier of a document. The document was listed in a ranked list of documents presented by the search engine in response to the query and was clicked on by the user. Other examples of implicit feedback include absence of activity at the user interface. For example, an event such as a user not accessing a document from a results list is assumed to be strongly correlated with document irrelevance. There are many other possible types of implicit feedback. For example, dwell time (how long a user directs a user interface pointer over a link in a document list. Different grades of implicit feedback can be envisaged. For example, if a user copies and pastes a link from the results list, or bookmarks the link this can be taken as high quality implicit feedback.

It is recognized herein that such different types of feedback information can advantageously be used to improve search results by making search results more relevant. For example this is achieved on an inter-query basis. That is, feedback from past user queries and/or assessor judgments is used to improve future searches made by the same or different users.

Previously it has been difficult to use both explicit and implicit relevance information in an effective way to improve information retrieval systems. However, by using both these types of relevance information, retrieval systems can be improved.

FIG. 1 is a schematic diagram of an information retrieval system 107 comprising an index generator 101, index 102, search engine 103 and user interface 104. The index generator and search engine may be integral although they are shown in FIG. 1 as separate entities for clarity.

A plurality of documents 100 are available for searching. For example, these may have been obtained using a web crawling process as known in the art or in any other suitable manner. Any number of documents may be searched including document collections containing large numbers (e.g. billions) of documents.

The index generator 101 is able to access the documents 100 in order to generate an index 102 of those documents. Any suitable index generation process may be used. For example, US-2005-0210006-A1 "Field weighting in text document searching" describes an index generator which generates individual document statistics for each document and stores those in an index. The document statistics are based on information from specified fields in each document. However, it is not essential to use this particular method of forming the index.

Once formed the index is updated at intervals. This is done because the documents 100 themselves change over time (for example, web sites are updated). Any suitable index update interval can be used such as daily, weekly or continual updates to the index.

Once the index has been formed it is possible for the search engine 103 to access or query the index 102 in order to generate a ranked list of documents 105 in response to user query terms 106. A user is able to enter query terms via a user interface 104 of any suitable type and to receive the ranked list of documents 105 via that user interface.

As mentioned above, previous query servers have operated by generating a single rank or relevance score for each indexed web page on the basis of the user input search terms. A ranking function is used to generate the document scores which are then sorted to produce a ranking. Typically these functions have had only a small number of free parameters (e.g. two free parameters in BM25) and as a result they are easy to tune for a given collection of documents, requiring few training queries and little computation to find reasonable parameter settings.

Ranking functions typically rank a document based on the occurrence of search terms within a document. More complex functions are required in order to take more features into account when ranking documents, such as where search terms occur in a document (e.g. in a title or in the body of text), link-graph features and usage features. As the number of functions is increased so is the number of parameters which are required. This increases the complexity of learning the parameters.

Machine learning may be used to learn the parameters within a ranking function (which may also be referred to as a ranking model). The machine learning system takes an objective function and optimizes it. There are many known metrics which are used to evaluate information retrieval systems, such as Normalized Discounted Cumulative Gain (NDCG), Mean Average Percision (MAP) and RPrec (precision at rank R, where R is the total number of relevant documents).

As mentioned above, it is desired to make use of both implicit and explicit relevance information to improve information retrieval systems. Previous approaches have chosen an evaluation measure, such as the label-based metric DCG, and built a model to optimize it. These approaches incorporate historical implicit feedback into a ranking function to predict a single relevance score.

It is desired to improve on these existing approaches to produce information retrieval results which are more relevant. This is achieved by arranging the search engine to incorporate both a prediction engine and a utility engine. The prediction engine is arranged to predict relevance information for results lists. The predicted relevance information may be implicit relevance information and/or explicit relevance information. The utility engine is arranged to take the predicted relevance information and use it to calculate a utility for each list. The lists are then ranked on the basis of the utility values.

Figure 2:
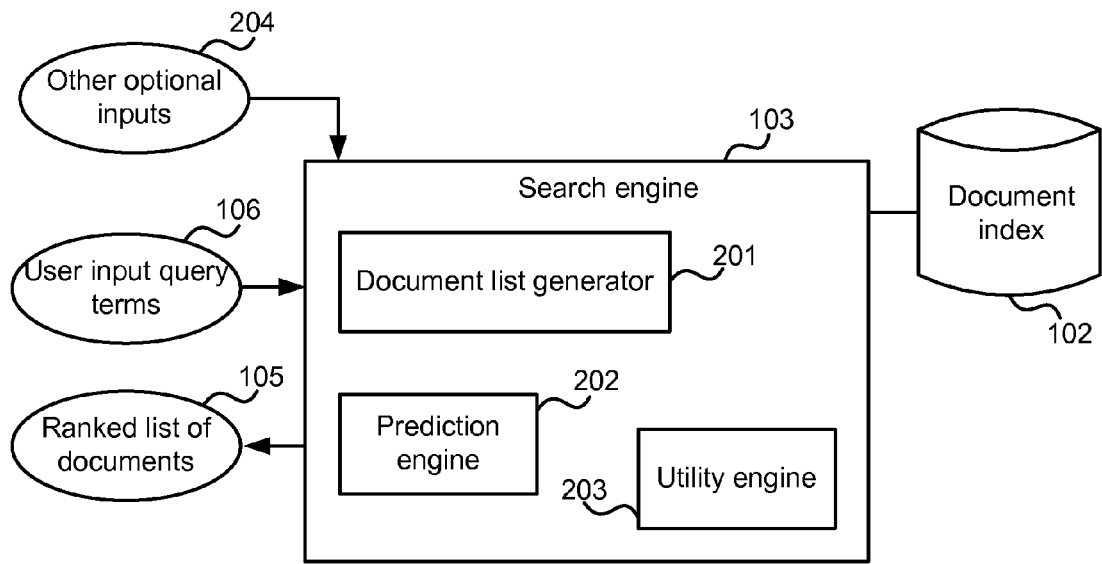
FIG. 2 is a schematic diagram of the search engine of the information retrieval system of FIG. 1.

FIG. 2 is a schematic diagram of the search engine 103 of FIG. 1 in more detail. The search engine comprises a document list generator 201 as well as a prediction engine 202 and a utility engine 203.

The document list generator 201 is arranged to receive user input query terms 106 and to generate proposed ranked lists of documents by accessing the document index 102. The document list generator 201 uses any suitable method to generate these proposed ranked lists of documents. A list may have an address or link to only one document or it may be a plurality of such addresses or links presented in an ordered manner.

The search engine also comprises a prediction engine 202 and a utility engine 203. The prediction engine is arranged to take information about the query terms 106 and proposed lists of documents and to predict implicit and/or explicit feedback for each of those proposed lists.

The prediction engine is a machine learning system. It may be trained during an off-line process and then continue to learn during use as part of an information retrieval system. It is also possible to initialize the prediction engine with random or default values and arrange it to train during use as part of an information retrieval system rather than training off-line.

For example, suppose that the prediction engine is trained offline using a data set taken from queries and documents concerning the general areas of administration and marketing. Later the prediction engine is installed in an information retrieval system to be used in an Intranet of an enterprise concerned with education and training. The challenge here is to ensure that the prediction engine is able to generalize to the new Intranet situation. This may be facilitated by using implicit relevance information obtained during use of the information retrieval system to dynamically adapt the prediction engine. Using implicit relevance information to adapt the prediction engine to the specific site for which it will be used enables the information retrieval system to give good performance, even where intranets and their user bases are diverse.

Figure 3:
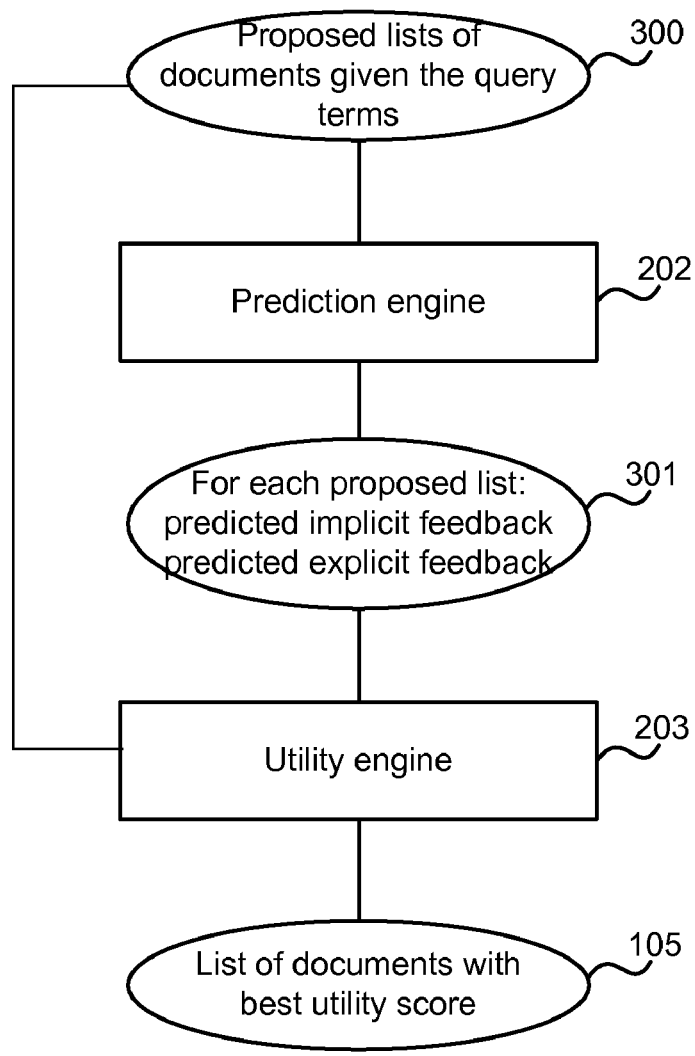
FIG. 3 is a block diagram of an example method of information retrieval.

Referring to FIG. 3 and FIG. 2, the prediction engine takes inputs x which comprise information about queries and information about documents 300. The inputs x may also comprise other optional types of information 204 such as characteristics of a user (human or automated operator of the information retrieval system). The prediction engine comprises a probabilistic model of the general form p(y|x,a) which is stored in memory. The model gives the probability p of observing y after selecting a when x is observed. The symbol x represents inputs to the prediction engine. The symbol y represents outputs from the model such as predicted judgments, predicted click behavior or other predicted relevance information 301. The symbol a represents a result list (ranked list of documents). Using historical {x, y, a} triplets the prediction model may be trained and tested. The prediction engine also comprises a processor arranged to apply the model to predict outputs y given particular input values x.

The utility engine 203 is arranged to take the predicted relevance information from the prediction engine, as well as the query terms 106 and proposed lists 300, and generate a utility score for each proposed list. One of the lists is selected on the basis of the utility scores and this list is stored and/or presented to the user as the ranked list of documents 105. The utility engine comprises a utility function stored in a memory and a processor arranged to apply the utility function to produce a real valued utility score for each proposed list of documents. The processor then ranks the proposed lists on the basis of the utility scores.

Because the prediction engine 202 and utility engine 203 are independent entities within the search engine 103 it is possible to modify or train these two entities separately. The problem of designing the utility function and the problem of constructing a good prediction model are decoupled. The prediction engine may be tested on historic data independently of the utility function. Also, the utility function may be adjusted and tuned incrementally over time without the need to retrain the prediction model with each new attempt.

Figure 4:
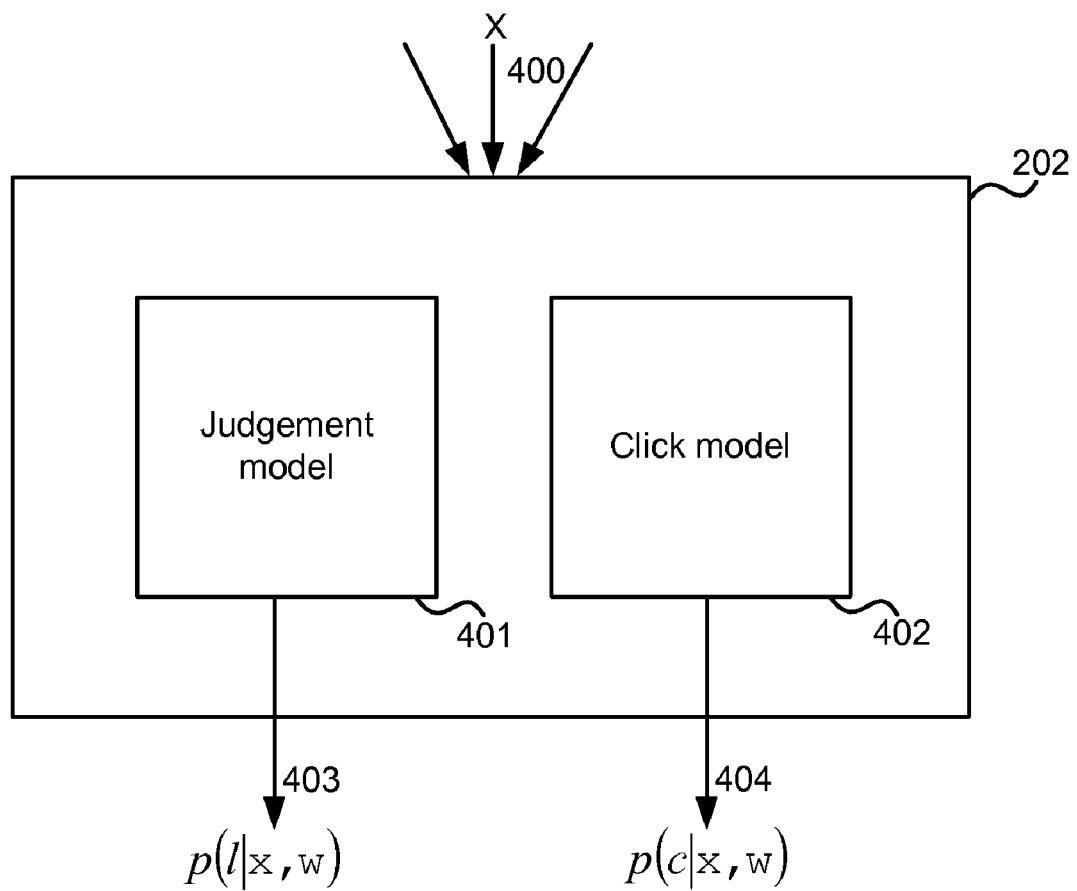
FIG. 4 is a schematic diagram of an example prediction engine.

In some embodiments the prediction engine comprises independent modules, one or more for predicting different types of explicit relevance information and one or more for predicting different types of implicit relevance information. In cases where these modules are independent they may be trained independently. For example, FIG. 4 shows the prediction engine 202 comprising a judgment model 401 stored in memory and a click model 402 stored in memory. The judgment model is applied by a processor in the prediction engine 202 to generate predicted explicit relevance information 403 using inputs x 400. The click model is applied by a processor in the prediction engine 202 to generate predicted implicit relevance information 404 using inputs x 400. For example, the predicted explicit relevance information is the probability of a particular relevance judgment (or label l) p(l|x,w) where w represents weights in the model. For example, the predicted implicit relevance information is the probability of a click event p(c|x,w). A click event occurs when an item in a list of documents is selected by a user (human or automated user). However, it is not essential for the prediction engine to comprise modules in this manner. A single prediction model which combines explicit and implicit relevance information may be used.

As mentioned above, the prediction engine comprises a probabilistic model of the general form p(y|x,a) which is stored in memory. In some embodiments, the prediction engine uses a generalized linear model for p(y|x,a). Generalized linear models (GLMs) are known and are described in detail in P. McCullagh and J. A. Nelder. Generalized Linear Models. CRC Press, $2^{nd}$. edition, 1990 which is incorporated herein by reference. However, it is not essential to use a GLM. For example, non-linear models may be used.

For example, the click model 402 comprises a GLM. A GLM consists of a likelihood model p(y|θ), a linear combination of inputs x and model weights w: x T w, and a link function g(θ) that maps the parameter θ to the real line. Building blocks are used that have a binomial likelihood model and a probit link function$^{-1}$. In a generative model interpretation the inverse probit link function $$g^{-1}(s) = \Phi\left(s; 0, \frac{1}{\pi}\right)$$

plays a central role. This inverse link function is a cumulative normal function that maps the outcome of the inner product $x^T w \in \mathbb{R}$ to the [0,1] space of the success parameter θ in the binomial. The inverse precision π can be set to an arbitrary number to fix the scale of the s-space. A Gamma prior is placed on π and integrated to obtain a robust model. If there are N examples in a training set for which the inputs have value x, and c positive outcomes are observed, the likelihood becomes:

$$p(c|x,w) = \text{Bin}(c; g^{-1}(x^T w), N) \tag{1}$$

Figure 5:
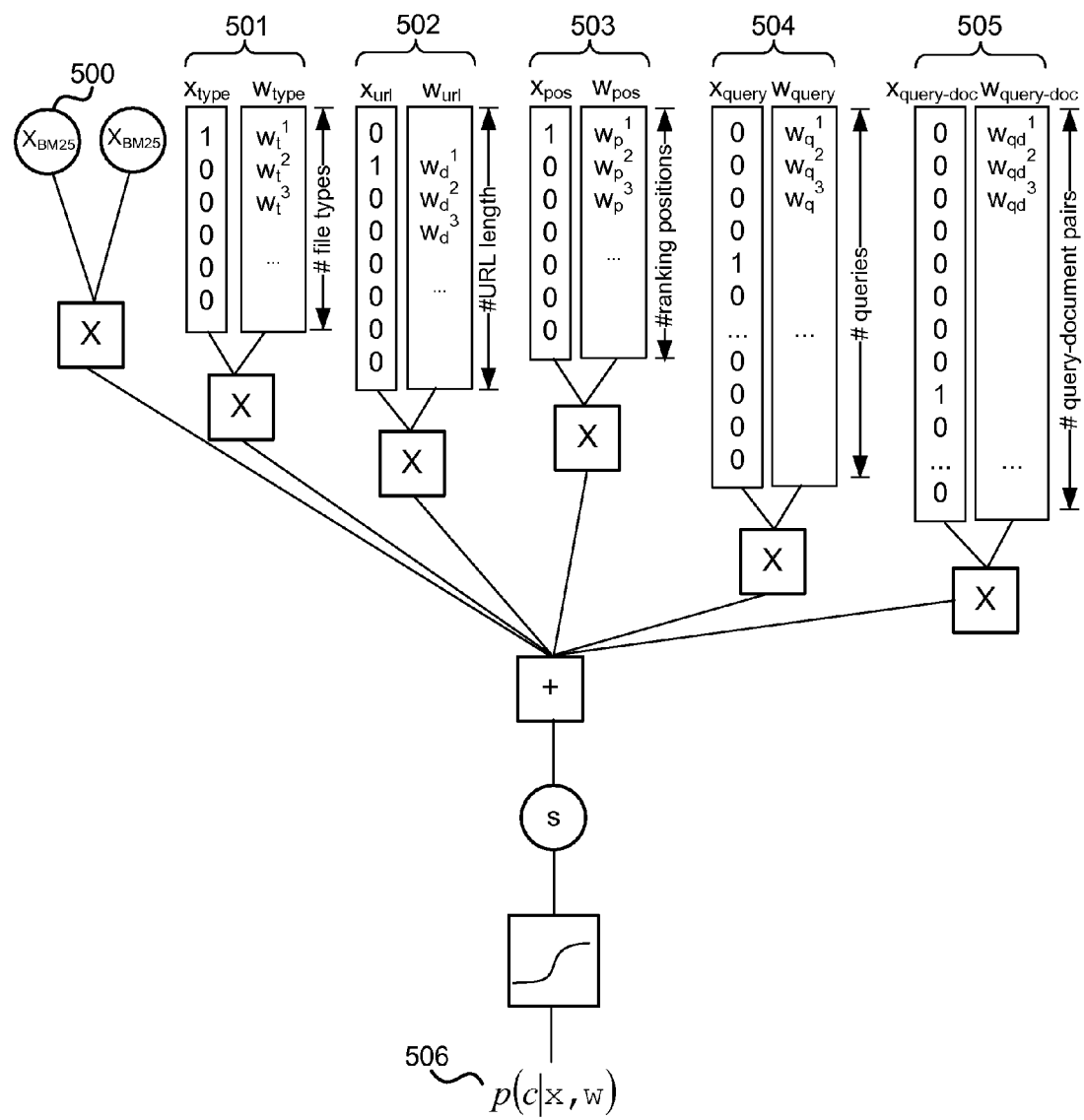
FIG. 5 is a schematic diagram of an example click prediction module.

An example of a click model 402 using a GLM is given in FIG. 5. The inputs comprise one real-valued feature (a BM25 score indicating a match between a query and a document) 500 and five bags of binary features 501-505. Each input has an associated weight indicated by the w values in FIG. 5. The output is the predicted probability of a click 506. The inputs comprise inputs that are query specific, inputs that are document specific and inputs that are derived from query-document pairs. For example, $x^{type}$ 501 represents an input describing information about a file type of a document (e.g. Html, Pdf, etc.); $x^{url}$ 502 represents an input describing information about the URL length of a document address; $x^{pos}$ 503 represents an input describing information about the position of a document in a ranked list of documents for which the click event was observed or is to be predicted; $x^{query}$ 504 represents an input describing a query ID; $x^{query-doc}$ represents an input describing a query-document ID.

The inputs which comprise descriptive features (such as the file type, URL length and ranking position) give the click model the ability to generalize between queries and documents. The identifier (ID) weights serve as an instance-specific memory. For frequently seen documents for popular queries the model is able to store, using the identifier weights, very accurate click predictions, even if they are far from the general trend predicted by the descriptive features. A bias term that is always 1 may be included to capture a grand average.

Figure 6:
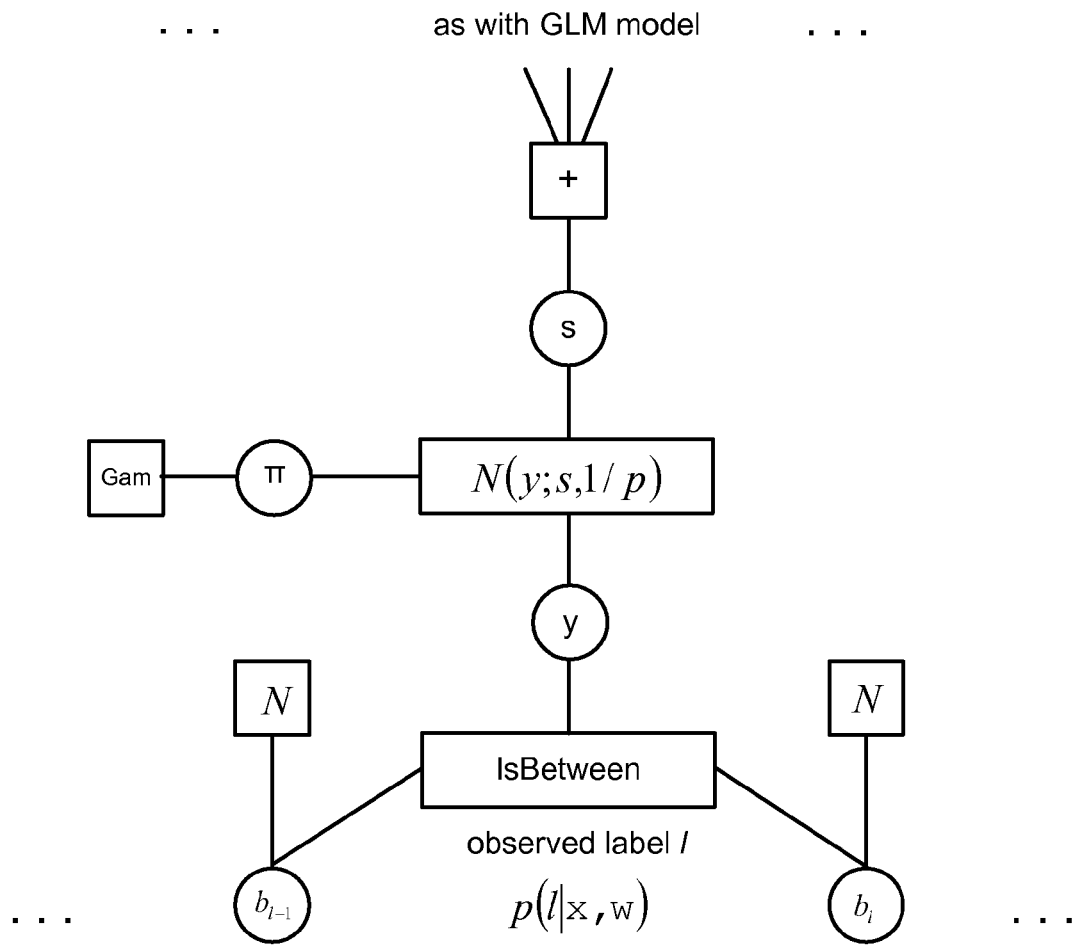
FIG. 6 is a schematic diagram of an example judgment prediction module.

An example of a judgment model 401 is given in FIG. 6. This has five possible label values that it can output. Weights, w are learnt for this model as well as boundary values b1, b2, b3, b4 which mark the edges in s-space of the five categories. Each category has a Gaussian prior. The IsBetween factor in FIG. 6 represents two step-functions that bound the interval for label 1. Added to the sum is a Gaussian disturbance with inverse precision $\pi$. This disturbance can be interpreted as a softening of the step function such that some noise in the label is supported by the model.

The inputs to the example judgment model of FIG. 6 may be as for the click model of FIG. 5. However, the outputs are handled differently. Noise N is added to the variable s; the result is then constrained to lie between two threshold variables $b_l$ and $b_{l-1}$ which correspond to the observed label l. Thresholds $b_l$ and $b_{l-1}$ are learnt in addition to the weights w.

As mentioned above, the model or models in the prediction engine are trained. For example, this is achieved using Bayesian update rules of any suitable type. In a particular embodiment, an approximate Bayesian inference procedure with a factorized Gaussian prior is used as now described.

The non-linearity of the inverse link function $g^{-1}(s)$ in equation (1) above has the effect that with a Gaussian prior on w the posterior after observing an input-output pair $x_i$, $y_i$ $$p(w|x_i, y_i) = \frac{p(y_i|x_i, w)p(w)}{p(y_i|x_i)}$$

is not Gaussian. For the logit-binomial there is no compact closed form solution to this posterior.

Using quadrature Expectation Propagation (EP) as described in O. Zoeter and T. Heskes. "Gaussian quadrature based expectation propagation." In AISTATS, pages 445-452, 2005 which is incorporated herein by reference, it is possible to approximate the posterior over the weights $p(w|\{x_i,y_i\})$ by a factorized Gaussian. Quadrature EP is a generalization of expectation propagation as described in T. Minka "A family of algorithms for approximate Bayesian Inference" PhD thesis, MIT, January 2001 (which is incorporated herein by reference) where general non-linearities are handled using low dimensional Gaussian quadrature approximations. This approximation is particularly suited for GLMs. For GLMs with Gaussian priors both the likelihood terms and the prior are log-concave. Since log-concavity is preserved under multiplication, the posterior therefore is guaranteed to be log-concave as well. This guarantees uni-modality of the posterior and makes a Gaussian approximation very suitable.

Within quadrature EP a proposal distribution (the kernel in the Gaussian quadrature) is required. For many GLMs the prior is a suitable choice. But for large N the binomial likelihood can shift the prior significantly, the prior might be ill matched with the posterior.

For binomial GLMs one approach is to use a proposal distribution based on a Gaussian approximation of the likelihood using Laplace's method. If one defines $s=x^T w$ and has a Gaussian prior $$p(s)=N(s;m,v)$$

and the Laplace approximation to the likelihood as $$\mathrm{Bin}(c; g^{-1}(s), N) \approx zN(s; m_{Lap}, v_{Lap})$$

$$m_{Lap} = \mathrm{argmax}_s \mathrm{Bin}(c; g^{-1}(s), N)$$

$$(v_{Lap})^{-1} = -\frac{\partial^2}{\partial s^2} \log \mathrm{Bin}(c; g^{-1}(s)N)\Big|_{s=m_{Lap}}$$

the proposal distribution is given by the product of the prior and the Gaussian approximation to the likelihood $$r(s) \alpha N(s;m,v)N(s;m_{Lap},v_{Lap}).$$

Both the mode and the variance can be found in closed form based on derivatives. However, is was found that the mean of this proposal distribution can still be significantly off and lead to failure of the quadrature. A practical solution is to use the precision derived from the above approximation, with the mean set to the mode of the posterior, found numerically. This is found to be a very robust approach defining the proposal distribution.

For N=c and c=0 a Gaussian proposal may be used with a mean given by the mode of the posterior (again found numerically), and a variance equal to the prior variance.

A benefit of this Bayesian procedure is that with each individual weight w a notion of the uncertainty about its optimal value is maintained. This results in a learning algorithm that correctly updates imprecisely determined weights more than precisely determined ones. The weights for descriptive features effectively see a lot more data than the query and document specific identifier weights. The Bayesian update rules ensure that each are updated at the appropriate rate.

More detail about the utility engine is now given. As mentioned above the utility engine applies a utility function which is stored in memory to particular inputs. The utility function represents user satisfaction with output of an information retrieval system as a single scalar value.

The information retrieval systems described herein can be thought of as applications of a decision theory approach to the real world problem of finding a ranked list of documents in response to a query. Given a set of inputs (query-document features) $x \in X$ the search engine is asked to select an action (result list of documents) $a \in A$. After performing the action outputs are observed (judgments, user behaviour, etc.) $y \in Y$. A utility function U: $X^*A^*Y \to \mathbb{R}$ assigns a scalar utility to the observed x, a, y-triple. The outputs y in general do not follow deterministically from the inputs x and action a. A model p(y|x,a) gives the probability of observing y after selecting a when x is observed. The optimal action a* is the action that leads to the maximal expected utility $$a^* = \mathrm{argmax}_a Ep(y|x,a)[U(x,a,y)]$$

By applying this decision theory approach to an information retrieval system it is possible to combine multiple sources of data in a principled way. For example, different sources of implicit feedback may be treated as extra dimensions in the output vector y.

In some embodiments the utility function is learnt using empirical results from experiments where users are asked to explicitly score their satisfaction with a search session. For example, suppose that users are asked to give a binary satisfaction signal t∈E {thumbs up, thumbs down},
and that a simple utility function is used
U(t=thumbs up)=1 and U(t=thumbs down)=0.
A model p(t|y) is then learnt to give a learnt utility U'

$$U'(x,y,a) = E_{p(t|x,y,a)}[U(t)].$$

In other embodiments experts are asked to craft a simple utility U(x, y, a) and this is then iteratively improved.

For example the utility function is arranged to combine both a signal stream of explicit label feedback and a stream of implicit user clicks. This utility function may be a convex combination of a label based utility and a click based utility. The label based utility is now described.

In one embodiment the utility function is a discounted cumulative gain (DCG) function as described in Jarvelin and Kekalainen "IR evaluation methods for retrieving highly relevant documents" in SIGIR, 2000 which is incorporated herein by reference. An example DCG function is now described.

The discounted cumulative gain (DCG) is an example of a utility function that takes into account the human relevance judgments at every position. It is based on a discount function d(p) over positions p∈{1,...,n}, and a gain function g(s) over human relevance judgments, e.g. s∈{1,...,5}. The position discount function is monotonically decreasing from the top position p=1, to the bottom position p=n: d(1)>d(2)>...d(n), and a gain function g(s) that is increasing for better relevance judgments: g(1)≦g(2)≦...≧g(5). If s[1], ..., s[n] are the scores received for the documents selected by a, the discounted cumulative gain is given by $$DCG(s[1],\ldots,s[n]) = \sum_{p=1}^{n} d(p)g(s[p]).$$

To maximize the DCG the utility engine is arranged to select and rank such that the expected DCG is highest. The expectation is then with respect to p(s[1], ..., s[n]|x,a) which represents the best estimate of the human relevance judgments for the documents selected by a given x $$a^* = \mathrm{argmax} E_{p(s[1],\ldots,s[n]|x,a)}\left(\sum_{p=1}^{n} d(p)g,(s[p])\right)$$

Different choices of g(s) lead to different ranking principles (decision rules). If g(s) is convex in s the resulting principle is risk seeking: for two documents with the same expected judgment but different variances the document with the larger variance is preferred. This is because a larger than expected judgment leads to a bigger rise in utility than the decrease in utility that results if a lower than expected judgment is encountered. Such a convex gain function leads to a "going for the jackpot" effect. The exponential function $g(s) = 2^s - 1$ has this effect. It is important to realize that this is not a conservative ranking principle.

If the utility engine uses a linear gain g(s)=s, the expected utility involves the expectations of judgments:

$$a^* = \mathrm{argmax}_a E_{p(s[1],\ldots,s[n]|x,a)}\left(\sum_{p=1}^{n} d(p)g,(s[p])\right)$$

$$= \mathrm{argmax}_a \sum_{p=1}^{n} d(p)E_{p(s[1],\ldots,s[n]|x,a)}[s[p]].$$

hence we get a ranking principle that simply orders documents according to their expected human relevance judgement:

$$a^* = \mathrm{argmax}_a \sum_{p=1}^{n} d(p)E_{p(s[p]|x,a)}[s[p]].$$

This utility function is an example where the optimal action can be found in O(|D|) time despite the fact that the space of all possible selections and rankings is $D^n$. This is due to the fact that the judgment probability p(s[p]|x,a) is not explicitly a function of position (the judge is presented with each document independently). This means that the expected judgment can be computed for each document and the documents simply sorted to obtain the optimal ranking.

Since there is no element in the example utility functions mentioned above that encourages diversity in the results, a constraint is added that links to documents cannot be replicated. Otherwise a* would be n insert duplications of the link with the highest expected relevance judgments.

In another embodiment the utility function depends on implicit relevance information. For example it takes into account whether or not a user clicked on a document.

$$U_{clicks(c[1],\ldots c[n])} = \sum_{p=1}^{n} d(p)c[p]$$

This is referred to herein as a click-DCG utility.

If p(c[p]=1|x,a), the probability of a click on the document that was put in position p by a, is modeled based on a link specific and position specific contribution it will in general not simplify to an O(|D|) ordering rule. This is because now p(c[p]|x,a) is explicitly a function of p—any given document will be clicked with a different probability depending on where it is placed. It can be that position and link effects combine in complex non-linear ways, in particular if unknown parameters are treated in a Bayesian way. However there are suitable heuristics for ordering in O(|D|), e.g. compute the probability a document will be clicked if it were placed in position 1, and order by that.

In another embodiment the utility function depends on both predicted implicit and predicted explicit relevance information. For example, the utility function is a weighted combination of the DCG utility function mentioned above and the click-DCG utility function mentioned above. For example, $$U(y) = (1-\lambda)U_{DCG}(y) + \lambda U_{clicks}(y) \quad (2)$$

The parameter λ is a design choice and may be set at 0.5 or any other suitable value between 0 and 1. For example, the click based component in the utility boosts results that are predicted to be popular. If judges are instructed to label according to authority the λ parameter allows the information retrieval system to trade-off popularity and authority.

By using a utility function which depends on both implicit and explicit relevance information it is possible to cope with noise in explicit relevance information. For example, if there is noise in a set of human judgment data, of if the prediction engine makes poor label predictions for a query, a suboptimal document ordering can be corrected by clicks.

Also, if the prediction engine correctly predicts labels but there are ties, a top three of only good documents say, users effectively vote with their mouse which one they prefer.

Because the information retrieval system uses a prediction engine which predicts clicks based on document and query features, an improvement in the ranking for popular queries also extends to unseen queries. For example, if a particular type or format of document (e.g. image, spreadsheet, word processed document) proves to be popular in a particular search context, that type of document can be boosted for all queries in that context.

In some embodiments the inputs to the prediction engine comprise the position of each document in a ranked list. In this case a position bias (whereby users are more likely to click documents higher in the ranked list for example) may be accounted for in the prediction engine. Also, in some embodiments, the inputs to the prediction engine comprise characteristics of a user, such as geographical location, spoken language, age, gender, or other characteristics. In this case the prediction engine may be trained to make use of this information so that the output of the information retrieval system is a personalized result list.

Diversity

In some embodiments the prediction engine and the utility engine are arranged to promote diversity in the result list. Current information retrieval systems do not adequately consider the multiple possible intents of a query. For example, a user may enter the query "jaguar" in order to find information about jaguar cats but the results list provided by the information system may only comprise links to documents about jaguar cars. To address this it is required to arrange the information retrieval system to diversify the results list by including links to documents in different categories (e.g. motor vehicles, animals) where the different categories are related to different interpretations of a query.

In one embodiment diversity is encouraged by using a diversity encouraging utility function. For example, modifying the click utility function mentioned above to comprise a concave function f of the sum of clicks as follows:

$$U_{clicks(c[1],\ldots c[n])} = f\left(\sum_{p=1}^{n} d(p)c[p]\right)$$

This captures the notion that the step from 0 clicks to 1 click on a page is bigger than that from 1 to 2. This utility function penalizes systems with click-DCG near zero. For an ambiguous query with several types of result, a ranking optimized to avoid zero click-DCG potentially presents results of each type, hedging its bets by giving a more diverse results list.

Other types of utility function may be used which also encourage diversity in the results list.

As well as using a modified utility function to encourage diversity, the prediction engine is arranged to capture correlations between click events on different documents listed in the same results list. For ambiguous queries clicks on links to two different interpretations will in general be anti-correlated; someone clicking on a link of one type will be less likely to also click on a link of the other type. To achieve this the prediction engine incorporates a model for the joint distribution $p(c[1], \ldots, c[n]|x, a)$.

For example, the prediction engine may be arranged to capture correlations between click events on different documents in the same results list by incorporating a collaborative filtering algorithm into the prediction engine. Collaborative filtering algorithms are known and are described in B. Marlin "Collaborative filtering" Master's thesis, University of Toronto, Canada, 2004. Any suitable collaborative filtering algorithm may be used. An example is described in Yewjin Lim and Yee Whye Teh "Variational Bayesian Approach to Movie Rating Prediction" KDDCup.07 Aug. 12, 2007 which is incorporated herein by reference. Any suitable approximation method may be used in conjunction with the algorithm described in the Lim and Teh document. The choice of approximation method is made based on the quality of the approximation and the properties of the application domain.

For example, the model may comprise a multi-dimensional latent space of interests, where each axis represents a genre or topic. A document would correspond to a point in this space indicating how well it covers each of the topics jaguar the car and jaguar the animal say). An intention underlying a query can then be a vector in this space. A projection of the document point to the intention vector indicates the degree of agreement. A probability of click is then a function of this agreement. For example, in a training set it may be observed that for the query "jaguar" there are two dominant vectors (intentions) in the population of searches: one roughly in the car and one in the animal direction. A utility that penalizes zero-clicks on a page then leads to a diverse offering, even if the top n car links are all on average more popular than the most popular animal link.

Experiments using the information retrieval system described herein in an enterprise search setting found improved performance as compared with an information retrieval system using only a DCG ranking function.

Information retrieval data was obtained from the Intranet of a single large multinational software corporation. For training, all queries and documents concerning the general areas of administration and marketing were obtained. For an adaptation set, simulating a potentially very different Intranet site, queries and documents of a technical nature were obtained.

The admin/marketing dataset used to train the prediction engine comprised 546 queries. For each query, about 100 documents from the top of a ranked list from a baseline ranker were judged, and some of them had click information. The click-prediction part of the prediction engine was further trained using the adaptation query set, comprising 201 technical queries. This simulated an on-site adaptation of the information retrieval system to user clicks in an enterprise. In this case, the explicit judgments concerning the technical documents were used for evaluation only and not for adapting the prediction engine.

The click information comprises not only the clicked documents but also the documents that were skipped, or passed over, on the way to a click. It was assumed that any document listed above the last click on the result list was examined. In this way the number of clicks and the number of examinations for a given query document pair was aggregated. A document which is clicked each time it is examined is a good result and a document that is rarely clicked having been examined is probably a poor result.

The utility engine was arranged to use a utility function as described above in equation 2. Experiments were carried out for different values of λ as described below. Queries from the test set were input to the information retrieval system and the results lists obtained were assessed using the NDCG metric for the first ten results in the results list. A graph of the average NDCG@10 scores (over all queries in the test set) against the value of λ0 is shown in FIG. 7.

Figure 7:
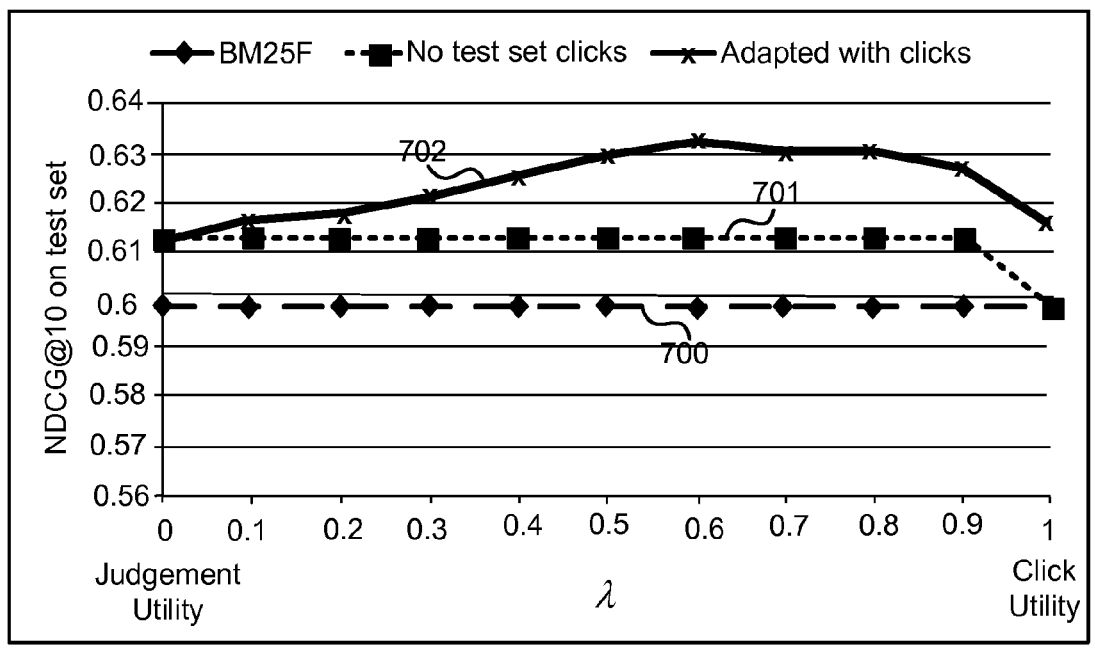
FIG. 7 is a graph of performance of an information retrieval system for different values of a parameter $\lambda$.

The lower dashed line in the graph of FIG. 7 represents the results obtained for an information retrieval system using the known BM25F ranking function as the search engine and where no historical click data was available to the search engine. This is a horizontal line 700 since ranking by BM25F doe not involve a λ parameter.

The dotted line 701 in the graph of FIG. 7 represents the results obtained for the information retrieval system as described herein trained using the admin/marketing data set but not adapted using the click data about technical documents. It is seen that performance is better than that of the BM25F ranking function (line 700) by about a 0.01 points on the NDGC@10 scale.

The solid line 702 in the graph of FIG. 7 represents the results obtained for the information retrieval system as described herein trained using the admin/marketing data and in addition, adapted using the click data about technical documents. It is seen that performance is always better than that of the BM25F ranking function (line 700) for any value of λ and by as much as about 0.03 points on the NDGC@10 scale when X is 0.5. This is despite the fact that the prediction engine is not arranged to optimize the NDGC@10 metric.

In addition, qualitatively it was found that mislabeled queries were filtered out, results lists for ambiguous queries were changed to better reflect the most often intended interpretation by users, and tie breaking of identically labeled results was achieved according to population preference.

Figure 8:
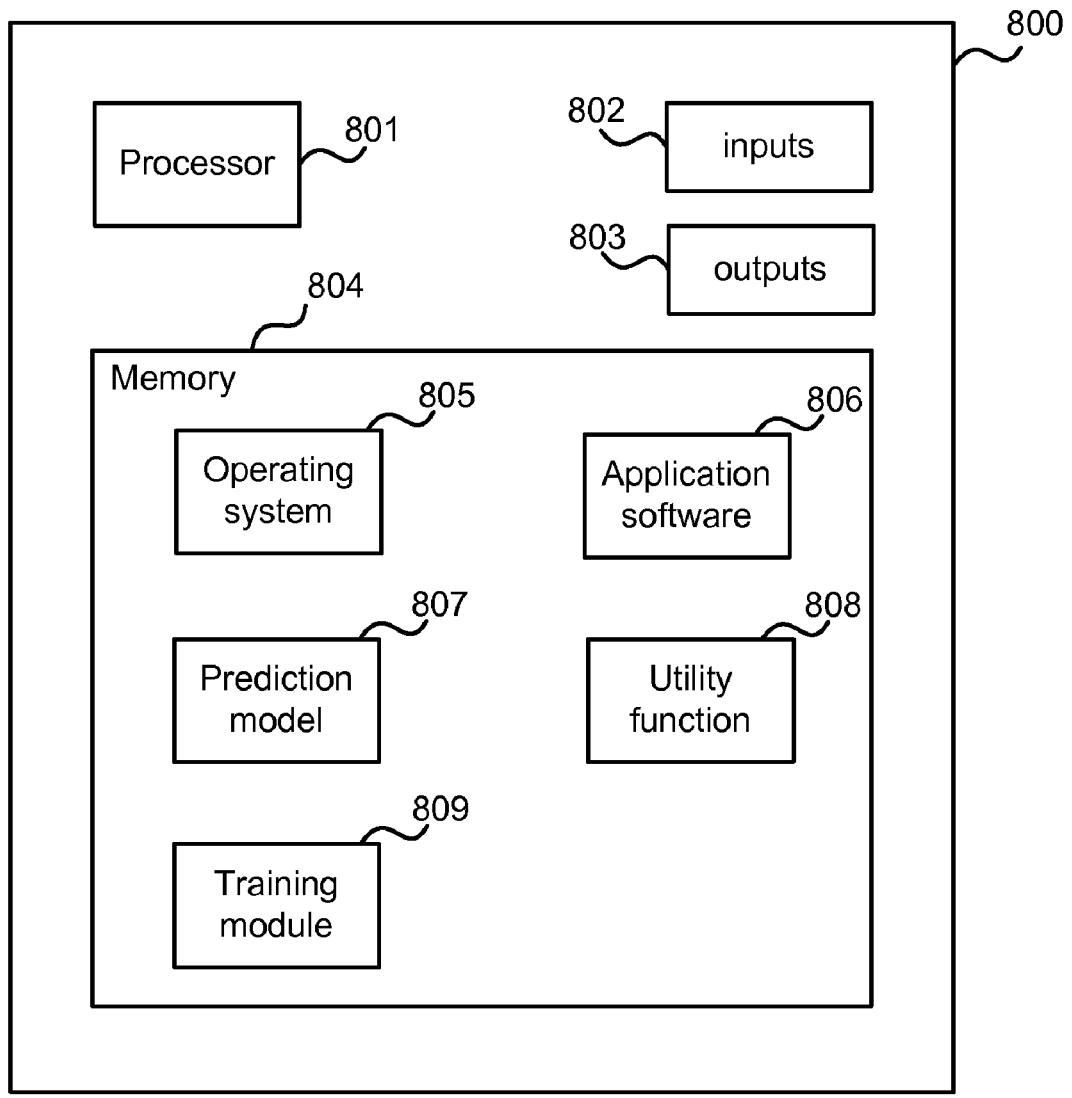
FIG. 8 illustrates an exemplary computing-based device in which embodiments of an information retrieval system may be implemented.

FIG. 8 illustrates various components of an exemplary computing-based device 800 which may be implemented as any form of a computing and/or electronic device, and in which embodiments of an information retrieval system may be implemented.

The computing-based device 800 comprises one or more inputs 802 which are of any suitable type for receiving queries, information about documents, information about users and any other data for input to a search engine. Computing-based device 800 also comprises one or more processors 801 which may be microprocessors, controllers or any other suitable type of processors for processing computing executable instructions to control the operation of the device in order to provide an information retrieval system. Platform software comprising an operating system 805 or any other suitable platform software may be provided at the computing-based device to enable application software 806 to be executed on the device.

The computer executable instructions may be provided using any computer-readable media, such as memory 804. A prediction model 807 is stored in the memory as well as a utility function 808 and a training module 809 for training the prediction model 807. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 803 is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An information retrieval system comprising:
an input arranged to receive user query terms;
a processor arranged to generate a plurality of lists of documents using the query terms and by accessing a document index;
a prediction engine arranged to predict, for each of the lists of documents, implicit relevance information and explicit relevance information;

a utility engine arranged to calculate a utility score for each of the lists of documents using the predicted relevance information and a stored utility function;

the utility engine also being arranged to select and store one of the lists of documents on the basis of the utility scores.

2. An information retrieval system as claimed in claim 1 wherein the prediction engine is a machine learning system comprising a stored probabilistic model of the form p(y|x,a), and wherein the prediction engine is arranged to apply the model to give the probability p of observing y after selecting a when x is observed, where the symbol x represents inputs to the prediction engine, the symbol y represents outputs from the model being predicted relevance information, and the symbol a represents a list of documents.

3. An information retrieval system as claimed in claim 1 wherein the prediction engine comprises at least two independent modules, one arranged to predict explicit relevance information and one arranged to predict implicit relevance information.

4. An information retrieval system as claimed in claim 1 wherein the prediction engine is a machine learning system comprising a stored Bayesian generalized linear model comprising a plurality of model weights.

5. An information retrieval system as claimed in claim 1 wherein the prediction engine comprises: a judgment model arranged to predict for each document in a ranked list of documents, a relevance judgment; and a click model arranged to predict for each document in a ranked list of documents, a click event.

6. An information retrieval system as claimed in claim 5 wherein the click model is arranged to take as input document specific features.

7. An information retrieval system as claimed in claim 6 wherein the click model is also arranged to take as input query related identifiers.

8. An information retrieval system as claimed in claim 1 wherein the utility engine comprises a stored utility function which is related to the discounted cumulative gain metric.

9. An information retrieval system as claimed in claim 1 wherein the utility engine comprises a stored utility function component which takes into account only predicted click events.

10. An information retrieval system as claimed in claim 1 wherein the utility engine comprises a stored utility function component which takes into account only predicted judgments.

11. An information retrieval system as claimed in claim 1 wherein the utility engine comprises a stored utility function comprising a first component which takes into account only predicted implicit relevance information and a second component which takes into account only predicted explicit relevance information and where those two components are combined using a specified parameter.

12. An information retrieval system as claimed in claim 9 wherein the utility function component incorporates a concave function in order to encourage diversity in the selected list of documents.

13. An information retrieval system as claimed in claim 12 wherein the prediction engine comprises a stored model which is arranged to model correlations between click events.

14. A computer-implemented method of retrieving a ranked list of documents from an index of documents comprising receiving at least one query term;

generating a plurality of lists of documents from the index using the query term;

predicting, for each of the lists of documents, implicit relevance information and explicit relevance information;

calculating a utility score for each of the lists of documents using the predicted relevance information and a stored utility function;

selecting and storing one of the lists of documents on the basis of the utility scores.

15. A computer-implemented method as claimed in claim 14 which comprises using a machine learning system comprising a stored probabilistic model of the form p(y|x,a) to make the prediction by applying the model to give the probability p of observing y after selecting a when x is observed, where the symbol x represents inputs to the prediction engine, the symbol y represents outputs from the model being predicted relevance information, and the symbol a represents a list of documents.

16. A computer-implemented method as claimed in claim 15 which further comprises training the model using historical {x, y, a} triplet values.

17. A computer-implemented method as claimed in claim 16 which further comprises using a Bayesian generalized linear model comprising a plurality of weights and obtaining values for the weights as a result of the training process.

18. One or more device-readable media with device executable instructions for performing steps comprising:

receiving at least one query term being part of a request to retrieve a ranked list of documents from a document index;

generating a plurality of ranked lists of documents from the index using the query term;

using a machine learning system comprising a stored probabilistic model to predict, for each of the ranked lists of documents, implicit relevance information and explicit relevance information;

calculating a utility score for each of the ranked lists of documents using both the predicted implicit relevance information and the predicted explicit relevance information as well as a stored utility function;

selecting and storing one of the ranked lists of documents on the basis of the utility scores.

19. One or more device-readable media as claimed in claim 18 further comprising device-executable instructions for performing steps comprising:

training the stored probabilistic model using historical values.

20. One or more device-readable media as claimed in claim 18 further comprising device-executable instructions for performing steps comprising:

using a specified parameter to combine two components of the utility function, one of those components related to explicit relevance information and the other of those components related to implicit relevance information.

* * * * *